US012345537B2

(12) United States Patent
Yang

(10) Patent No.: US 12,345,537 B2
(45) Date of Patent: Jul. 1, 2025

(54) ROUTE SUGGESTION DEVICE AND METHOD THEREFOR

(71) Applicants: Hyundai Motor Company, Seoul (KR); Kia Corporation, Seoul (KR)

(72) Inventor: Dong Il Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 199 days.

(21) Appl. No.: 18/108,955

(22) Filed: Feb. 13, 2023

(65) Prior Publication Data

US 2024/0027214 A1 Jan. 25, 2024

(30) Foreign Application Priority Data

Jul. 22, 2022 (KR) .................. 10-2022-0091291

(51) Int. Cl.
*G01C 21/34* (2006.01)
*B60L 53/60* (2019.01)
*G01C 21/36* (2006.01)

(52) U.S. Cl.
CPC .......... *G01C 21/3476* (2013.01); *B60L 53/60* (2019.02); *G01C 21/3469* (2013.01); *G01C 21/3679* (2013.01)

(58) Field of Classification Search
None
See application file for complete search history.

(56) References Cited

U.S. PATENT DOCUMENTS

| | | | | |
|---|---|---|---|---|
| 8,880,337 B2* | 11/2014 | Scholl | ................ | G01C 21/3867 701/426 |
| 2010/0106401 A1* | 4/2010 | Naito | ..................... | B60L 53/00 701/533 |
| 2017/0087999 A1* | 3/2017 | Miller | ..................... | B60L 58/12 |
| 2017/0138750 A1* | 5/2017 | Weber | ..................... | B60L 58/13 |
| 2021/0080282 A1* | 3/2021 | Goei | ................... | G01C 21/3679 |
| 2023/0038012 A1* | 2/2023 | Erozlu | ................... | B60L 58/13 |

* cited by examiner

*Primary Examiner* — Tamara L Weber
(74) *Attorney, Agent, or Firm* — Fox Rothschild LLP

(57) ABSTRACT

A route suggestion device and a method therefor are provided. The route suggestion device includes at least one processor. The at least one processor determines whether it is possible for a vehicle to arrive at a destination based on a current drivable distance, when the destination is set, searches for at least one charging station in a route where the vehicle arrives at the destination, using a driving scheduling function of scheduling a final route to the destination, in response to that it is determined that it is impossible for the vehicle to arrive at the destination, determines a first charging station as a waypoint based on an item of interest of a passenger, in which a will of the passenger is reflected, among the at least one charging station, and generates an optimal route including the first charging station. In addition, various embodiments recognized through the specification are possible.

18 Claims, 5 Drawing Sheets

ROUTE SUGGESTION DEVICE AND METHOD THEREFOR

CROSS-REFERENCE TO RELATED APPLICATION

This application claims, under 35 U.S.C. § 119(a), the benefit of priority to Korean Patent Application No. 10-2022-0091291, filed in the Korean Intellectual Property Office on Jul. 22, 2022, the entire contents of which are incorporated herein by reference.

BACKGROUND

1. Technical Field

The present disclosure relates to a route suggestion device and a method therefor, and more particularly, relates to technologies for suggesting a route in which a driver's will is reflected.

2. Background

Recently, interest in electric vehicles and hybrid vehicles has been increased to reduce carbon emissions. In general, an electric vehicle (EV) refers to a vehicle which uses its battery and motor without using petroleum-based fuels and an engine.

When a route farther than a distance to empty (DTE) of the EV is set, charging station transit information (e.g., a place and a required charging time) may be exposed in the EV such that the EV arrives at a destination. However, when the number of chargers capable of charging the EV is insufficient when the EV arrives at the charging station, unproductive elements such as an increase in unexpected driving time and route resetting may increase.

Thus, the driver of the EV is wasting time during a charging time after the EV arrives at the charging station in the route, or should separately search around the charging station and select a charging station.

SUMMARY

The present disclosure has been made to address the above-mentioned problems occurring in the prior art while advantages achieved by the prior art are maintained intact.

An aspect of the present disclosure provides a route suggestion device for scheduling the entire process where a passenger arrives at a destination and guiding the passenger along the scheduled process and a method therefor.

Another aspect of the present disclosure provides a route suggestion device for removing an unproductive element where a driver additionally searches for a charging station to improve the convenience of the driver and a method therefor.

Another aspect of the present disclosure provides a route suggestion device for removing an unproductive element where an unexpected driving time increases because it is impossible to charging the vehicle when the vehicle arrives at the charging station to improve convenience and a method therefor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a route suggestion device may include at least one processor. The at least one processor may be configured to determine whether it is possible for a vehicle to arrive at a destination based on a current drivable distance of the vehicle, may search for at least one charging station along a route to the destination, by using a driving scheduling function of scheduling a final route to the destination, if it is determined that it is impossible for the vehicle to arrive at the destination without being charged, may determine a first charging station chosen from among the at least one charging station as a suitable waypoint based on an item of interest of a passenger of the vehicle, the item of interest reflecting a will of the passenger, and may generate an optimal route to the destination including the first charging station.

In an embodiment, the at least one processor may monitor a charger of the first charging station to identify whether it is possible to use the charger of the first charging station in real time.

In an embodiment, the item of interest of the passenger may be identified by a user input of the passenger. The at least one processor may search for a place associated with the item of interest of the passenger, in response to the user input, and may determine the first charging station as the waypoint, based on the found result.

In an embodiment, the item of interest of the passenger may include an item for a place where the passenger is able to utilize a time when the vehicle is charged during the time at the first charging station.

In an embodiment, the route suggestion device may further include an audio, video, navigation (AVN) device. The at least one processor may direct the AVN to display the item of interest of the passenger in the form of a pop-up notification by the AVN device.

In an embodiment, the route suggestion device may further include an AVN device. The at least one processor may direct the AVN to display a final schedule where the vehicle passes through the first charging station, by the AVN device and may monitor at least one charger of the first charging station, while the vehicle is traveling, and may continue displaying the final schedule by the AVN device, if it is determined that there is a charger available at the first charging station. The final schedule where the vehicle passes through the first charging station may include a final route including the first charging station, a shortest distance to the destination, and a charging time at the first charging station.

In an embodiment, the at least one processor may monitor at least one charger of the first charging station, while the vehicle is traveling, and may search for a charging station capable of charging the vehicle along the route to the destination again, when it is determined that there is no charger available at the first charging station.

In an embodiment, the at least one processor may automatically change the waypoint to a second charging station chosen from among charging stations found again along the destination, based on the item of interest of the passenger.

In an embodiment, the route suggestion device may further include an AVN device. The at least one processor may direct the AVN to display a final schedule where the vehicle passes through the second charging station by the AVN device, after the waypoint is automatically changed to the second charging station. The final schedule to the destination may include a final route including the second charging station, a shortest distance to the destination, and a charging time at the second charging station.

In an embodiment, the at least one processor may determine the first charging station as the waypoint with regard to a charging time from among the at least one charging station, after searching for the at least one charging station.

According to another aspect of the present disclosure, a route suggestion method may include determining whether it is possible for a vehicle to arrive at a destination based on a current drivable distance, searching for at least one charging station along a route to the destination, using a driving scheduling function of scheduling a final route to the destination, if is determined that it is impossible for the vehicle to arrive at the destination without being charged, determining a first charging station chosen from among the at least one charging station as a suitable waypoint based on an item of interest of a passenger of the vehicle, the item of interest reflecting a will of the passenger and generating an optimal route to the destination including the first charging station.

In an embodiment, the route suggestion method may further include monitoring a charger of the first charging station to identify whether the charger of the first charging station is available in real time.

In an embodiment, the item of interest of the passenger may be identified by a user input of the passenger. The determining of the first charging station as the waypoint step may include searching for a place associated with the item of interest of the passenger, in response to the user input, and determining the first charging station as the waypoint, based on the found result.

In an embodiment, the item of interest of the passenger may include an item for a place where the passenger is able to utilize a time frame when the vehicle is charged during the time at the first charging station.

In an embodiment, the route suggestion method may further include displaying the item of interest of the passenger in the form of a pop-up notification by an AVN device.

In an embodiment, the route suggestion method may further include displaying a final schedule where the vehicle passes through the first charging station by an AVN device and monitoring least one charger of the first charging station, while the vehicle is traveling, and continuously displaying the final schedule by the AVN device, if it is determined that there is a charger available at the first charging station. The final schedule where the vehicle passes through the first charging station may include a final route including the first charging station, a shortest distance to the destination, and a charging time at the first charging station.

In an embodiment, the route suggestion method may further include monitoring the at least one charger of the first charging station, while the vehicle is traveling, and searching for a charging station capable of charging the vehicle along the route to the destination, when it is determined that there is no charger available at the first charging station.

In an embodiment, the route suggestion method may further include automatically changing, by the at least one processor, the waypoint to a second charging station chosen from among charging stations found again along the route to the destination, based on the item of interest of the passenger.

In an embodiment, the route suggestion method may further include displaying a final schedule where the vehicle passes through the second charging station by the AVN device, after the waypoint is automatically changed to the second charging station. The final schedule where the vehicle passes through the second charging station may include a final route including the second charging station, a shortest distance to the destination, and a charging time at the second charging station.

In an embodiment, the route suggestion method may further include determining the first charging station as the waypoint with regard to a charging time from among the at least one charging station, after searching for the at least one charging station.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
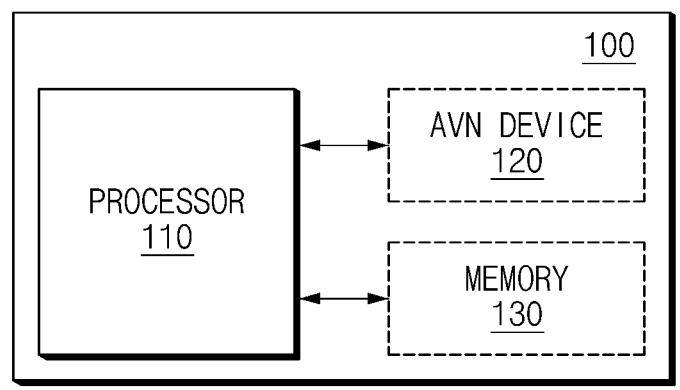
FIG. 1 is a block diagram of a route suggestion device according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all tams including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 5.

FIG. 1 is a block diagram of a route suggestion device 100 according to an embodiment of the present disclosure.

Referring to FIG. 1, the route suggestion device 100 according to an embodiment may include a processor 110, an audio, video, navigation (AVN) device 120, and a memory 130. In various embodiments, the route suggestion device 100 may include an additional component other than the components shown in FIG. 1, or may omit at least one of the components shown in FIG. 1.

According to an embodiment, the processor 110 may be electrically connected with the AVN device 120 and the memory 130 and may electrically control the respective components. The processor 110 may be an electrical circuit which executes instructions of software and may perform a variety of data processing and calculation described below.

According to an embodiment, the processor 110 may interwork with the AVN device 120 provided in a vehicle to receive an input for selecting a driver.

According to an embodiment, the processor 110 may include, for example, an electronic control unit (ECU), a micro controller unit (MCU), or another sub-controller, which is loaded into the vehicle.

According to an embodiment, the processor 110 may execute calculation and data processing about control and/or communication of at least one other component of the route suggestion device 100 using instructions stored in the memory 130. Detailed contents associated with an operation of the processor 110 will be described below with reference to FIGS. 2 to 4.

According to an embodiment, the AVN device 120 may include a speaker and a display.

According to an embodiment, the display included in the AVN device 120 may include at least one of a liquid crystal display (LCD), a thin film transistor-liquid crystal display (TFT-LCD), an organic light-emitting diode (OLED) display, a flexible display, a three-dimensional (3D) display, a transparent display, a head-up display (HUD), a touch screen, a cluster, or a combination thereof.

According to an embodiment, the display may be implemented as a touch screen to receive a user input associated with an item of interest of a passenger from the passenger. For example, the item of interest of the passenger may include an item for at least one of a cultural space, a cafe, a restaurant the interior of a vehicle, or a combination thereof where the passenger is able to use a charging time of the vehicle.

According to an embodiment, the item of interest of the passenger may be provided in a visual form (e.g., in the form of a pop-up) by means of the display.

According to an embodiment, the display may be implemented as a touch screen coupled to a touch sensor to be used as an input device. For example, a touch film, a touch pad, or the like may be used as the touch sensor.

According to an embodiment, the display may be used as an input device which receives a user input of the passenger. According to an embodiment, the user input of the passenger may include a user input for selecting one of items of interest of the passenger, which are provided in the form of a pop-up.

According to an embodiment, the memory 130 may store data to be used for route search. For example, the data to be used for the route search may include at least one of driver charging information or vehicle charging information.

For example, the memory 130 may include at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, an optical disk, or a combination thereof.

Figure 2:
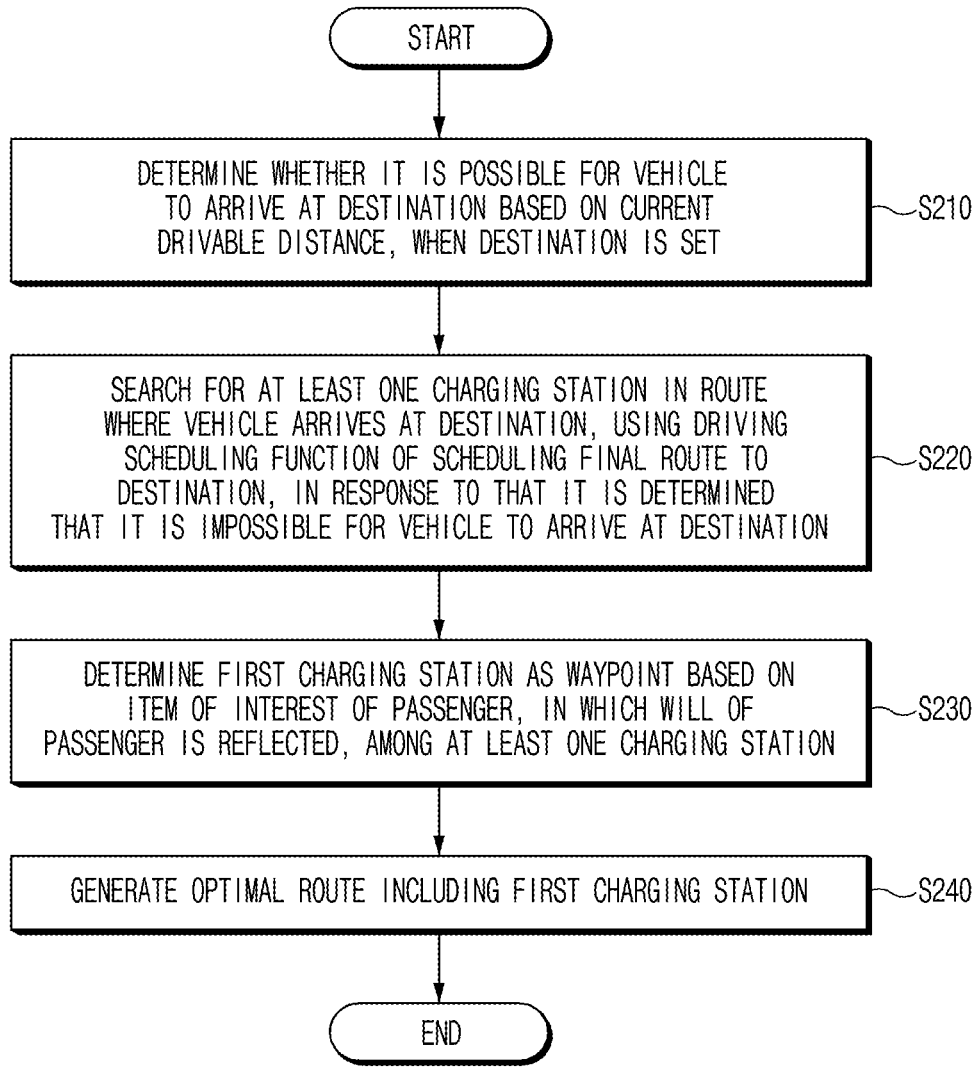
FIG. 2 is a flowchart illustrating a route suggestion method according to an embodiment of the present disclosure.

FIG. 2 is a flowchart illustrating a route suggestion method according to an embodiment of the present disclosure.

Operations in S210 to S240 in an embodiment below may be sequentially performed, but are not necessarily sequentially performed. For example, an order of the respective operations may be changed, and at least two operations may be performed in parallel.

Referring to FIG. 2, in a route suggestion device and a method therefor according to an embodiment, in S210, when a destination is set, a processor may determine whether it is possible for a vehicle to arrive at the destination based on a current drivable distance.

According to an embodiment, when at least one of a destination, a waypoint, or a combination thereof is set, the processor may determine whether it is possible for the vehicle to arrive at the destination or the waypoint based on a current state of charge (SoC) or a distance to empty (DTE) (or a drivable distance) of the vehicle.

According to various embodiments, the vehicle may include a hydrogen vehicle, an electric vehicle, a plug-in hybrid electric vehicle (PHEV), or the like. However, the vehicle is not limited thereto, which may include a vehicle which is charged in various forms.

According to an embodiment, when the DTE (or the drivable distance) is less than a distance to the destination or the waypoint, based on the current SoC, the processor may determine that it is impossible for the vehicle to arrive at the destination or the waypoint.

According to an embodiment, when the DTE (or the drivable distance) is greater than the distance to the destination or the waypoint, based on the current SoC, the processor may determine that it is possible for the vehicle to arrive at the destination or the waypoint.

According to an embodiment, in S220, the processor may search for at least one charging station in a route where the vehicle arrives at the destination, using a driving scheduling function of scheduling a final route to the destination, in response to that it is determined that it is impossible for the vehicle to arrive at the destination.

According to an embodiment, when the DTE (or the drivable distance) is less than the distance to the destination or the waypoint, the processor may use the driving scheduling function of scheduling the final route to the destination.

According to an embodiment, when it is determined that it is impossible for the vehicle to arrive at the destination, the processor may schedule a route where the vehicle passes through a charging station using the driving scheduling function.

According to an embodiment, the driving scheduling function may refer to a function of scheduling a final route based on a shortest distance to the destination and/or a charging time at a waypoint (e.g., a charging station) and providing a passenger with a final schedule.

According to an embodiment, the processor may activate the driving scheduling function and may schedule a final route, based on at least one of position information of the vehicle, a current SoC, a DTE, information of a charger in a charging station to pass through, a type of the charger, position information of the charging station, or a combination thereof.

According to an embodiment, when the destination is set and when it is determined that it is impossible for the vehicle to arrive at the destination based on the DTE of the vehicle, the processor may search for at least one charging station in the route where the vehicle arrives at the destination.

According to an embodiment, when it is determined that it is impossible for the vehicle to arrive at the destination, the processor may obtain information about at least one charging station.

According to an embodiment, the information about the at least one charging station may include at least one of state information of a charger in the at least one charging station, a type of the charger, position information of the at least one charging station, information about convenient facilities around the at least one charging station, or a combination thereof.

For example, the state information of the charger in the at least one charging station may include whether the charger is available and/or an estimated time taken for charging.

According to an embodiment, in S230, the processor may determine a first charging station among the at least one charging station as a waypoint based on an item of interest of the passenger, in which a will of the passenger is reflected.

According to an embodiment, the item of interest of the passenger, in which the will of the passenger is reflected, may be previously input and may be identified by means of a user input.

According to an embodiment, the processor may display the item of interest of the passenger to allow the passenger to select the item of interest of the passenger by means of the display included in the AVN device.

According to an embodiment, the processor may display the item of interest of the passenger in a visual form (e.g., in the form of a pop-up) by means of the AVN device.

According to an embodiment, the item of interest of the passenger may include an item for a place capable of providing a rest space desired by a passenger (e.g., a driver).

According to an embodiment, the item of interest of the passenger may include an item for a place capable of providing a rest space desired by the passenger while the vehicle is charged.

For example, the item of interest of the passenger may include an item for at least one of a cultural space, a cafe, a restaurant, the interior of a vehicle, or a combination thereof. However, the item of interest of the passenger is not limited thereto, which may include an item for various places where the passenger is able to use a charging time of the vehicle.

According to an embodiment, the processor may receive a user input for selecting the item of interest of the passenger. For example, the user input may include a touch input, a voice input, or the like.

According to an embodiment, the processor may search for a place associated with the item of interest of the passenger, based on the user input for selecting the item of interest of the passenger or a previously input item of interest.

For example, the place associated with the item of interest of the passenger may include a place in a route to the destination.

According to an embodiment, the processor may determine the first charging station as a waypoint, based on the found result.

For example, when the passenger receives a user input for selecting a cultural space (e.g., a museum, an exhibition hall, an art gallery, a movie theater, or the like), the processor may search for the cultural space.

According to an embodiment, the processor may search for a charging station close to the found cultural space.

For example, the charging station close to the cultural space may refer to a charging station where a distance from the cultural space is less than a threshold distance, among the found at least one charging station.

Furthermore, for example, when receiving a user input where the passenger selects a restaurant, the processor may search for the restaurant and may determine a charging station close to the restaurant as a waypoint.

Furthermore, for example, when receiving a user input where the passenger selects a cafe, the processor may search for the cafe and may determine a charging station close to the cafe as a waypoint.

Furthermore, for example, when receiving a user input where the passenger selects the interior of the vehicle, the processor may determine a charging station in a route to the destination.

According to an embodiment, the processor may determine the first charging station among the at least one charging station as a waypoint, based on the user input.

According to an embodiment, in S240, the processor may generate an optimal route including the first charging station.

According to an embodiment, the processor may generate an optimal route to the destination including the first charging station, in response to that the first charging station is determined as the waypoint.

According to an embodiment, the processor may recommend (or propose) the optimal route to the destination including the first charging station to the passenger, in response to that the first charging station is determined as the waypoint.

According to an embodiment, the processor may monitor a charger of the first charging station to identify whether the charger of the first charging station is available in real time.

According to an embodiment, the processor may identify whether the charger of the first charging station is available in real time and may generate an optimal route including the first charging station when the charger of the charging station is available.

Figure 3:
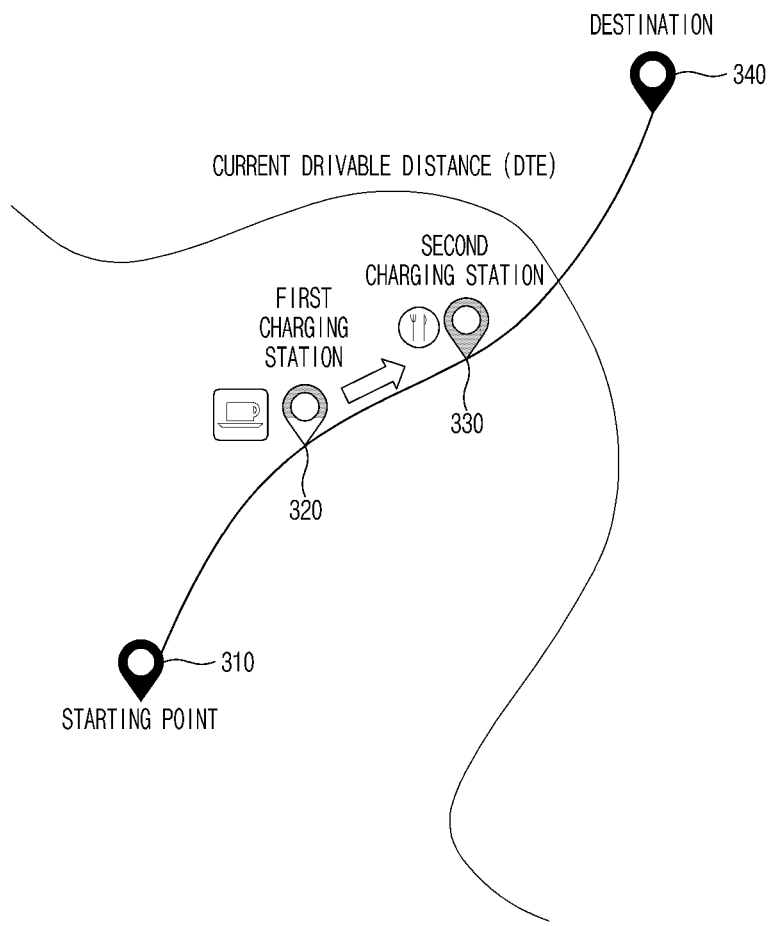
FIG. 3 illustrates displaying a final schedule along an optimal route to a destination in a route suggestion device and a method therefor according to an embodiment of the present disclosure.

FIG. 3 illustrates displaying a final schedule along an optimal route to a destination in a route suggestion device and a method therefor according to an embodiment of the present disclosure. Contents, which are duplicated with or correspond to the contents described above in conjunction with contents of FIG. 3, may be briefly described or omitted.

Referring to FIG. 3, after a destination 340 of a vehicle is set, the route suggestion device according to an embodiment may determine whether it is possible for the vehicle to arrive at the destination 340, based on a distance between a starting point 310 and the destination 340 and a current drivable distance of the vehicle.

According to an embodiment, when it is determined that it is impossible for the vehicle to arrive at the destination 340, the route suggestion device may set (or determine) a charging station capable of charging the vehicle in a route to the destination 340 as a waypoint.

According to an embodiment, when determining the charging station as the waypoint, the route suggestion device may reflect a will of a driver (or a passenger). In detail, the route suggestion device may reflect a place where the driver wants to spend time after the charging of the vehicle is started to select a charging station.

For example, the place where the driver wants to spend time after the charging of the vehicle is started may include a cultural space (e.g., a movie theater, an art gallery, a museum, an exhibition hall, or the like), a cafe, a restaurant, the interior of the vehicle, or the like.

According to an embodiment, the route suggestion device may display an item associated with the place where the driver wants to spend time, by means of an AVN device.

For example, the route suggestion device may display the item associated with the place in a visual form (e.g., in the form of a pop-up) by means of the AVN device.

According to an embodiment, the route suggestion device may receive a user input for selecting an item associated with the place by means of an AVN device.

According to an embodiment, the route suggestion device may determine a first charging station 320 as a waypoint based on the received user input.

For example, the route suggestion device may determine the first charging station 320, which is close to a cafe or in which there is the cafe, in response to receiving a user input for selecting the cafe.

According to an embodiment, after determining the first charging station 320 as the waypoint, the route suggestion device may generate a route including the first charging station 320.

According to an embodiment, the route suggestion device may generate an optimal route, based on a shortest distance to the destination 340 and an estimated charging time at the first charging station 320.

According to an embodiment, after generating the optimal route, the route suggestion device may notify a passenger of a final schedule (or share the final schedule with the passenger).

According to an embodiment, the route suggestion device may provide (or output) the final schedule to the passenger in an audible form (e.g., a voice or a sound) or a visual form by means of the AVN device.

According to an embodiment, the final schedule where the vehicle passes through the first charging station 320 may include a final route including the first charging station 320, a shortest distance to the destination 340, and a charging time at the first charging station 320.

According to the above-mentioned embodiment, the route suggestion device according to an embodiment of the present disclosure may guide the passenger to understand the entire schedule (e.g., an estimated route, an estimated time, or the like) to the destination 340 by providing the final schedule to the passenger.

According to an embodiment, the route suggestion device may monitor a charger of the first charging station 320 selected as the waypoint while the vehicle is traveling.

According to an embodiment, the route suggestion device may reflect the result of monitoring the charger of the first charging station 320 in the route to the destination 340 in real time.

For example, the route suggestion device may monitor the charger of the first charging station 320 and may search for a charging station capable of charging the vehicle again in the route where the vehicle arrives at the destination 340, when it is determined that there is no charger available at the first charging station 320.

According to an embodiment, after searching for the charging station capable of charging the vehicle again in the route to the destination 340, the route suggestion device may automatically the waypoint to a second charging station 330 among charging stations which are found again at the first charging station 320.

According to an embodiment, after the waypoint is automatically changed to the second charging station 330, the route suggestion device may display a final schedule where the vehicle passes through the second charging station 330 by means of the AVN device.

According to an embodiment, the final schedule where the vehicle passes through the second charging station 330 may include a final route including the second charging station 330, a shortest distance to the destination 340, and a charging time at the second charging station 330.

Figure 4:
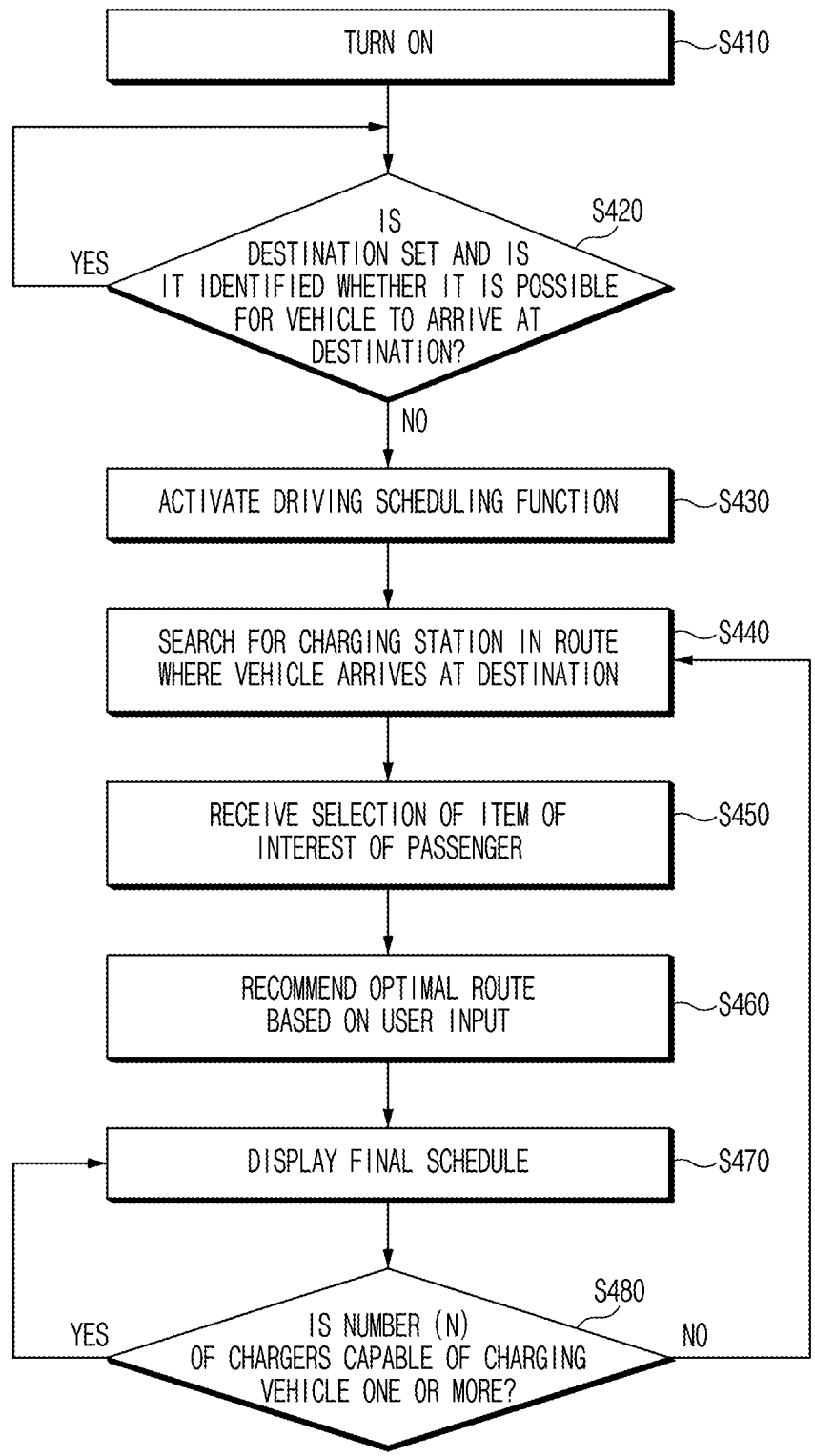
FIG. 4 is a flowchart illustrating monitoring a charger of a charging station in a route suggestion device and a method therefor according to an embodiment of the present disclosure.

FIG. 4 is a flowchart illustrating monitoring a charger of a charging station in a route suggestion device and a method therefor according to an embodiment of the present disclosure.

Operations in S410 to S480 in an embodiment below may be sequentially performed, but are not necessarily sequentially performed. For example, an order of the respective operations may be changed, and at least two operations may be performed in parallel.

Contents, which correspond to or are duplicated with the contents described above in conjunction with contents of FIG. 4, may be briefly described or omitted.

Referring to FIG. 4, in the route suggestion device and the method therefor according to an embodiment, in S410, a processor may determine whether a vehicle is turned on.

According to an embodiment, the processor may determine whether power is supplied to the vehicle. For example, the processor may determine whether the ignition of the vehicle is on.

According to an embodiment, in S420, when a destination is set, the processor may identify whether it is possible for the vehicle to arrive at the destination.

According to an embodiment, after it is identified that the vehicle is turned on, the processor may receive a destination setting.

For example, the destination may be set by a touch input or a voice input through a display.

According to an embodiment, after the destination is set, the processor may determine whether it is possible for the vehicle to arrive at the set destination.

According to an embodiment, the processor may determine whether it is possible for the vehicle to arrive at the destination based on a current SoC or a DTE (or a drivable distance) of the vehicle.

According to an embodiment, when it is determined that it is impossible for the vehicle to arrive at the destination (No of S420), in S430, the processor may activate a driving scheduling function.

According to an embodiment, when it is determined that it is impossible for the vehicle to arrive at the destination based on the current SoC or the DTE (or the drivable distance) of the vehicle, the processor may activate the driving scheduling function of scheduling a final route to the destination.

According to an embodiment, the driving scheduling function may refer to a function of generating an optimal route based on a shortest distance to the destination and/or a charging time at a charging station.

According to an embodiment, in S440, the processor may search for a charging station in a route for destination arrival.

According to an embodiment, in the state where the driving scheduling function is activated, the processor may search for at least one charging station.

According to an embodiment, in S450, the processor may receive a selection of an item of interest of a passenger.

According to an embodiment, the route suggestion device may display an item associated with the place where the driver wants to spend time, by means of an AVN device.

For example, the route suggestion device may display the item associated with the place in a visual form (e.g., in the form of a pop-up) by means of the AVN device.

According to an embodiment, the route suggestion device may receive a user input for selecting the item associated with the place, by means of an AVN device.

According to an embodiment, in S460, the processor may recommend an optimal route based on the user input.

According to an embodiment, the processor may search for a place associated with the item of interest of the passenger, based on the user input for selecting the item of interest of the passenger.

For example, the place associated with the item of interest of the passenger may include a place in a route to the destination. In detail, the place associated with the item of interest of the passenger may include a place where the driver wants to spend time while the vehicle is charged.

According to an embodiment, the processor may determine a first charging station as a waypoint, based on the user input.

According to an embodiment, the processor may provide (or recommend) the optimal route including the first charging station to the passenger.

According to an embodiment, in S470, the processor may display a final schedule.

According to an embodiment, the processor may visually provide the passenger with the final schedule where the vehicle passes through the first charging station by means of the display.

According to an embodiment, the final schedule where the vehicle passes through the first charging station may include a final route including the first charging station, a shortest distance to the destination, and a charging time at the first charging station.

According to an embodiment, in S480, the processor may determine whether the number of chargers capable of charging the vehicle at the first charging station is one or more.

According to an embodiment, the processor may monitor a charger of the first charging station selected as the waypoint while the vehicle is traveling.

According to an embodiment, the processor may monitor a charger of the first charging station to determine whether the number of charger capable of charging the vehicle at the first charging station is one or more.

According to an embodiment, when it is determined that the number of chargers capable of charging the vehicle at the first charging station is one or more (Yes of S480), the processor may return to S470 to continue displaying the final schedule.

According to an embodiment, when it is determined that the number of the chargers capable of charging the vehicle at the first charging station is not one or more (No of S480), the processor may return to S440 to search for a charging station in the route for destination arrival again.

According to an embodiment, after searching for the charging station capable of charging the vehicle in the route to the destination again, the processor may automatically change the waypoint to a second charging station among charging stations which are found again at the first charging station.

According to an embodiment, after the waypoint is automatically changed to the second charging, the processor may display the final schedule where the vehicle passes through the second charging station by means of the AVN device.

According to an embodiment, the final schedule where the vehicle passes through the second charging station may include a final route including the second charging station, a shortest distance to the destination, and a charging time at the second charging station.

According to the above-mentioned embodiment, the route suggestion device according to an embodiment of the present disclosure may reflect the result of monitoring the charger of the charging station in the route in real time, thus removing an unproductive factor where the driver additionally searches for a charger to improve the convenience of the driver.

Figure 5:
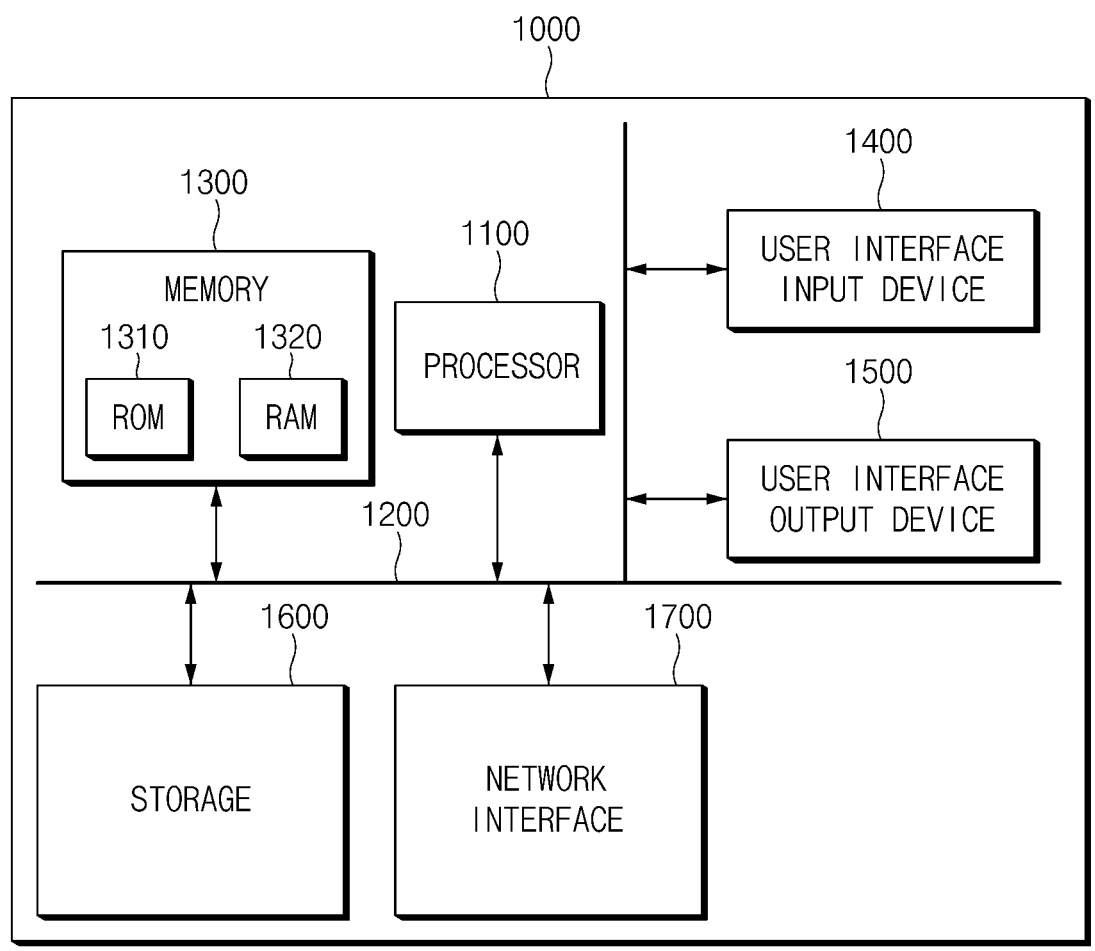
FIG. 5 illustrates a computing system about a route suggestion device and a method therefor according to an embodiment of the present disclosure.

FIG. 5 illustrates a computing system about a route suggestion device and a method therefor according to an embodiment of the present disclosure.

Referring to FIG. 5, a computing system 1000 about the route suggestion device and the method therefor may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the ROUTE SUGGESTION DEVICE AND the method therefor according to an embodiment of the present disclosure.

According to at least one of embodiments of the present disclosure, the ROUTE SUGGESTION DEVICE may provide a DTE display function such that the driver is able to use a charging time, when the vehicle should pass through a charging station to arrive at a destination.

Furthermore, according to at least one of embodiments of the present disclosure, the ROUTE SUGGESTION DEVICE may assist the driver to reduce the number of times of searching for a charging station and efficiently drive the vehicle.

Furthermore, according to at least one of embodiments of the present disclosure, the ROUTE SUGGESTION DEVICE may improve a brand image and marketability according to quality improvement.

Furthermore, according to at least one of embodiments of the present disclosure, the ROUTE SUGGESTION DEVICE may be easily applied to all electric vehicles, thus saving costs.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A route suggestion device, comprising:
   at least one processor; and
   an audio, video, navigation (AVN) device,
   wherein the at least one processor is configured to:
   determine whether it is possible for a vehicle to arrive at a destination based on a current drivable distance of the vehicle;
   search for at least one charging station along a route to the destination by using a driving scheduling function to schedule a final route to the destination if it is determined that it is impossible for the vehicle to arrive at the destination without being charged;
   determine a first charging station chosen from among the at least one charging station as a suitable waypoint based on an item of interest of a passenger of the vehicle, the item of interest reflecting a will of the passenger;
   generate an optimal route to the destination including the first charging station;
   direct the AVN device to display a final schedule where the vehicle passes through the first charging station,
   monitor at least one charger of the first charging station, while the vehicle is traveling, and
   continue directing the AVN device to display the final schedule, if it is determined that there is a charger available at the first charging station,
   wherein the final schedule where the vehicle passes through the first charging station includes: a final route including the first charging station, a shortest distance to the destination, and a charging time at the first charging station.

2. The route suggestion device of claim 1, wherein the at least one processor is further configured to monitor a charger of the first charging station to identify whether it is possible to use the charger of the first charging station in real time.

3. The route suggestion device of claim 1, wherein the item of interest of the passenger is identified by a user input of the passenger, and
   wherein the at least one processor is further configured to search for a place associated with the item of interest of the passenger, in response to the user input, and determine the first charging station as the waypoint, based on the found result.

4. The route suggestion device of claim 1, wherein the item of interest of the passenger includes an item for a place where the passenger is able to utilize a timeframe when the vehicle is being charged at the first charging station.

5. The route suggestion device of claim 1,
   wherein the at least one processor is further configured to display the item of interest of the passenger in the form of a pop-up notification by the AVN device.

6. The route suggestion device of claim 1, wherein the at least one processor is further configured to:
   monitor at least one charger of the first charging station, while the vehicle is traveling, and
   search for a charging station capable of charging the vehicle along the route to the destination again, if it is determined that there is no charger available at the first charging station.

7. The route suggestion device of claim 6, wherein the at least one processor is further configured to automatically change the waypoint to a second charging station chosen from among the charging stations found again along the route to the destination, based on the item of interest of the passenger.

8. The route suggestion device of claim 7,
   wherein the at least one processor is configured to direct the AVN device to display the final schedule where the vehicle passes through the second charging station, after the waypoint is automatically changed to the second charging station, and
   wherein the final schedule where the vehicle passes through the second charging station includes a final route including the second charging station, a shortest distance to the destination, and a charging time at the second charging station.

9. The route suggestion device of claim 1, wherein the at least one processor is further configured to determine the first charging station as the waypoint with regard to a charging time from among the at least one charging station, after searching for the at least one charging station.

10. A route suggestion method, comprising:
    determining whether it is possible for a vehicle to arrive at a destination based on a current drivable distance of the vehicle;
    searching for at least one charging station along a route to the destination, using a driving scheduling function of scheduling a final route to the destination determining that it is impossible for the vehicle to arrive at the destination without being charged;
    determining a first charging station chosen from among the at least one charging station as a suitable waypoint based on an item of interest of a passenger of the vehicle, the item of interest reflecting a will of the passenger;
    generating an optimal route to the destination including the first charging station;
    displaying a final schedule where the vehicle passes through the first charging station by an audio, video, navigation (AVN) device;
    monitoring at least one charger of the first charging station, while the vehicle is traveling, and
    continuously displaying the final schedule by the AVN device, if it is determined that there is a charger available at the first charging station,
    wherein the final schedule where the vehicle passes through the first charging station includes a final route including the first charging station, a shortest distance to the destination, and a charging time at the first charging station.

11. The route suggestion method of claim 10, further comprising:
    monitoring a charger of the first charging station to identify whether the charger of the first charging station is available in real time.

12. The route suggestion method of claim 10, wherein the item of interest of the passenger is identified by a user input of the passenger, and
    wherein the determining of the first charging station as the waypoint step further includes:
    searching for a place associated with the item of interest of the passenger, in response to the user input; and
    determining the first charging station as the waypoint, based on the found result.

13. The route suggestion method of claim 10, wherein the item of interest of the passenger includes an item for a place where the passenger is able to utilize a timeframe when the vehicle is being charged at the first charging station.

14. The route suggestion method of claim 10, further comprising:
    displaying the item of interest of the passenger in the form of a pop-up notification on the AVN device.

15. The route suggestion method of claim 10, further comprising:
   monitoring the at least one charger of the first charging station, while the vehicle is traveling, and
   searching for a charging station capable of charging the vehicle along the route to the destination again, if it is determined that there is no charger available at the first charging station.

16. The route suggestion method of claim 15, further comprising:
   automatically changing the waypoint to a second charging station chosen from among charging stations found again along the route to the destination, based on the item of interest of the passenger.

17. The route suggestion method of claim 16, further comprising:
   displaying a final schedule where the vehicle passes through the second charging station by the AVN device, after the waypoint is automatically changed to the second charging station, and
   wherein the final schedule where the vehicle passes through the second charging station includes a final route including the second charging station, a shortest distance to the destination, and a charging time at the second charging station.

18. The route suggestion method of claim 10, further comprising:
   determining the first charging station as the waypoint with regard to a charging time from among the at least one charging station, after searching for the at least one charging station.

* * * * *